United States Patent Office 2,809,963
Patented Oct. 15, 1957

2,809,963
AZO-DYESTUFFS

Walter Hanhart, Riehen, Switzerland, assignor to Ciba Limited, Basel, Switzerland, a Swiss firm No Drawing. Application October 14, 1955, Serial No. 540,623

Claims priority, application Switzerland October 26, 1954

10 Claims. (Cl. 260—155)

This invention provides new direct-dyeing azo-dyestuffs which like, for example, the trisazo-dyestuff of the constitution (1)

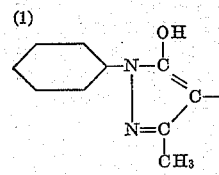

correspond to the general formula (2)

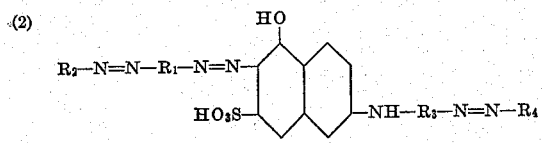

in which $R_1$ represents a diphenyl radical bound in the 4- and 4'-positions to the azo linkages and containing in the 3- and 3'-positions substituents which in conjunction with the hydroxyl groups present in the adjacent radicals in positions vicinal to the azo linkage are capable of forming metal complexes, $R_2$ represents the radical of a coupling component bound to the azo linkage by a keto-methylene group, $R_3$ represents a radical of the benzene series, which contains a sulfonic acid group and of which the carbon atoms bound to the —NH— group and the —N=N— group are separated from one another by at least two carbon atoms, and $R_4$ represents the radical of an 8-hydroxyquinoline.

The invention also provides a process for the manufacture of the dyestuffs of the above Formula 2 wherein an 8-hydroxyquinoline is coupled with a diazo compound of an aminoazo-dyestuff of the formula (3)

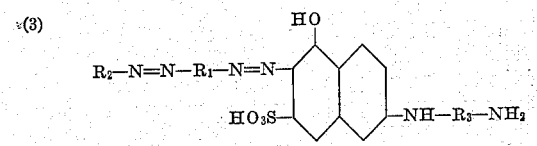

in which $R_1$ represents a diphenyl radical bound in the 4- and 4'-positions to the azo linkages and containing in the 3- and 3'-positions substituents which are capable of forming metal complexes in conjunction with hydroxyl groups present in the adjacent radicals in positions vicinal to the azo linkages, $R_2$ represents the radical of a coupling component bound to the azo linkage through a keto-methylene group, and $R_3$ represents a radical of the benzene series which contains a sulfonic acid group and of which the carbon atoms bound to the —NH— group and the $H_2N$— group are separated from one another by at least two carbon atoms.

The aminoazo-dyestuffs of the Formula 3 used as starting materials may be prepared by coupling a tetrazo compound of a 4:4'-diamino-1:1'-diphenyl which contains in the 3- and 3'-positions the substituents mentioned above, on the one hand, with a coupling component which owes its capacity for coupling to the presence of an enolizable or enolized keto-methylene group and, on the other, with a coupling component of the formula (4)

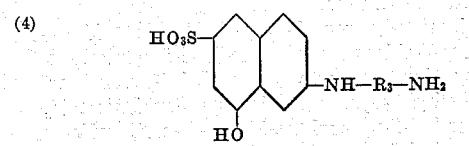

in which $R_3$ has the meaning given above. The diamine contains in the 3- and 3'-positions substituents which are capable of forming metal complexes in conjunction with the enolized keto group in the coupling component providing the radical $R_2$ and with the hydroxyl group in the 1-position of the naphthalene nucleus of the coupling component of the Formula 4. These substituents in the 3- and 3'-positions are advantageously substituents capable of forming stable metal complexes directly with the aforesaid hydroxyl groups. Substituents of this kind, therefore, do not include substituents which like, for example, methoxy groups, form only unstable metal complexes (for example, ortho-hydroxy-ortho'-alkoxyazo-copper complexes) with the said hydroxyl groups, or which, also like the methoxy group, are capable of forming stable complexes only indirectly, that is to say, after being converted into another group (for example, by splitting the methyl group from the methoxy group) and do not simply exchange the cation for a metal capable of forming complexes. Especially good results are usually obtained with 4:4'-diamino-diphenyl compounds which contain in each of the 3- and 3'-positions a substituent of the formula (5)

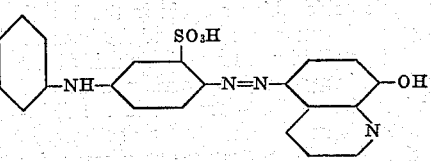

in which $m$ and $n$ each represent a whole number not greater than 2. As examples of such diamines there may be mentioned 3:3'-di-(carboxymethoxy)-4:4'-diaminodiphenyl, 4:4'-diaminodiphenyl-3:3'-dicarboxylic acid and especially 3:3'-dihydroxy-4:4'-diaminodiphenyl. However with 3:3'-dimethoxy-4:4'-diaminodiphenyl there are also obtainable valuable dyestuffs.

As coupling components which owe their capacity for coupling to the presence of an enolizable or enolized keto-methylene group, there may be used, for example, acylacetylamino-aryl compounds, especially acetoacetyl-aminobenzenes, which may contain further substituents in the benzene radical, and advantageously pyrazolones. Among the latter compounds there may be mentioned above all 5-pyrazolones, for example, 3-methyl-5-pyrazolone and 1-phenyl-5-pyrazolone, such as 1-phenyl-5-pyrazolone-3-carboxylic acid or 1-phenyl-3-methyl-5-pyrazolone. In the case of phenyl-pyrazolones, the phenyl radical, may contain the usual substituents, for example, halogen atoms such as chlorine or bromine, alkyl or alkoxy groups of low molecular weight, such as methyl, ethyl, methoxy or ethoxy groups, or especially groups imparting solubility in water, such as sulfonic acid amide groups, carboxylic acid groups or sulfonic acid groups. As examples of coupling components which owe their capacity for coupling to the presence of an enolizable or enolized keto-methylene group, and which are generally assumed to be present in the enol form in the finished dyestuff during the metallization and in the metal complex, there may also be mentioned the following compounds:

Benzoylacetylamino-benzene,
Acetoacetylamino-benzene,
1-acetoacetylamino-benzene-3- or -4-sulfonic acid,
1-(2'-, 3'- or 4'-chlorophenyl)-3-methyl-5-pyrazolone,
1-(2'-, 3'- or 4'-methylphenyl)-3-methyl-5-pyrazolone,
1-phenyl-3-methyl-5-pyrazolone-3'- or -4'-sulfonic acid,
1-phenyl-3-methyl-5-pyrazolone-3'- or -4'-carboxylic acid,
1-phenyl-3-methyl-5-pyrazolone-3'-sulfonic acid amide, and
1 - (4' - hydroxyphenyl) - 3 - methyl - 5 - pyrazolone - 3'-carboxylic acid.

The coupling components of the above formula (4) which are also to be coupled with the tetrazotized 4:4'-diaminodiphenyl compounds defined above are 5-hydroxynaphthalene-7-sulfonic acids which contain in the 2-position an —NH— group bound to a radical of the benzene series which contains as substituents a sulfonic acid group and a diazotizable amino group, the carbon atoms of this radical bound to the —NH— group and the H₂N-group being separated from one another by at least two carbon atoms so that the said groups may be present, for example, in para-position relatively to one another, or when the radical R₃ contains two benzene nuclei bound to one another, one of these nuclei carries the —NH— group and the other the H₂N-group.

As an example of a coupling component of the formula 4 there may be mentioned 2-[4'''-amino-1':1''-diphenylamino-(4')]-5-hydroxynaphthalene-7:3''-disulfonic acid of the formula

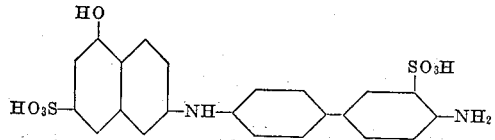

Very valuable dyestuffs are obtained from 2-(4'-aminophenylamino)-5-hydroxynaphthalene-7:3'-disulfonic acid.

The two coupling components may be coupled with the tetrazotized diamine in either order of succession. It is, however, preferable to couple the tetrazo-compound first with the less reactive component, that is to say, usually with the component of the Formula 4. The couplings may be carried out in known manner, for example, in an alkaline medium. The second coupling may be carried out in a medium which assists the coupling, such as alcohol or pyridine.

The aminoazo-dyestuffs of the Formula 3 so obtained are advantageously diazotized by the so-called indirect method, in which, for example, a solution or suspension, which contains the amino-disazo-dyestuff in the form of an alkali metal salt and advantageously contains a slight excess of free alkali and also the necessary quantity of nitrite, is combined with an excess of dilute hydrochloric acid.

The diazo-compound is then coupled with an 8-hydroxyquinoline, for example, 8-hydroxyquinoline-7-sulfonic acid or advantageously 8-hydroxyquinoline itself.

The coupling of the amino-azo-compound with the 8-hydroxyquinoline is advantageously carried out in an alkaline medium, for example, a medium rendered alkaline with an alkali metal carbonate or an alkaline earth metal hydroxide, and, if desired, with the addition of a substance assisting the coupling, such as pyridine.

In general it is desirable so to choose the starting materials that the final products contain a total of 2–3 sulfonic acid groups.

The dyestuffs of the Formula 1 above are suitable for dyeing and printing a very wide variety of materials, for example, those of animal origin, such as wool, silk or leather, and especially for dyeing or printing cellulosic materials, such as cotton, linen, and artificial silk or staple fibers of regenerated cellulose. They may be treated on the fiber or in the dyebath with an agent yielding metal, advantageously an agent yielding copper. For this purpose there are especially suitable those dyestuffs which contain no sulfonic acid groups other than those indicated by the formula. The treatment with an agent yielding metal may be carried out in known manner, for example, on the fiber or in a single bath in part in the dyebath itself and in part on the fiber. There is advantageously used, for example, the process of U. S. Patent No. 2,148,659, filed April 2, 1936, by Fritz Straub et al., in which there are carried out in one and the same bath first the dyeing and then the treatment with the agent yielding metal. As agents yielding metal there come into consideration advantageously those which are stable towards alkaline solutions, such as complex copper tartrates or alkali metal copper pyrophosphates, and also cuprous thiocyanate which is an especially suitable coppering agent for use in printing cellulosic materials.

In some cases it is of special advantage to produce dyeings by the process in which the dyeing or print produced with the metal-free dyestuff is after-treated with an aqueous solution which contains a basic condensation product of formaldehyde with a compound which contains at least once the atomic grouping

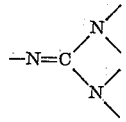

for example, dicyandiamide or dicyandiamidine, or with a compound, such as cyanamide, easily converted into a compound containing the aforesaid atom grouping, and which solution also contains a water-soluble, especially complex, copper compound. Processes of this kind are described, for example, in British Patent No. 619,969, filed June 26, 1946, by Otto Albrecht et al.

The dyeings obtainable with the new dyestuffs in the manner described above are generally distinguished by their good properties of fastness, especially by their good fastness to light and washing.

The following examples illustrate the invention, the parts and percentages being by weight unless otherwise stated, and the relationship of parts by weight to parts by volume being the same as that of the kilogram to the liter:

Example 1

10.8 parts of 3:3'-hydroxy-4:4'-diaminodiphenyl are tetrazotized in the usual manner. To the resulting suspension of the tetrazo-compound there are added 15 parts of sodium chloride for every 100 parts by volume of suspension, and the mixture is stirred for a short time and filtered. The tetrazo-compound is poured into a cooled solution, rendered alkaline with sodium carbonate, of 20.5 parts of 2-(4'-aminophenylamino)-5-hydroxynaphthalene-7:3'-disulfonic acid in 100 parts of water, and the mixture is stirred, while cooling, until the diazo-monoazo-compound is formed. The whole is filtered, and the filter residue is thoroughly washed on the filter with dilute sodium chloride solution, and then stirred in water and a small amount of ice. To the suspension is added a solution of 9.6 parts of 1-phenyl-3-methyl-5-pyrazolone in 50 parts of water, 7.3 parts of sodium hydroxide solution of 30 percent strength and 10 parts of anhydrous sodium carbonate. In order to accelerate the coupling 50 parts of pyridine are added. The whole is stirred initially while cooling, and towards the end the temperature is raised to 25–30° C.

The precipitated disazo-dyestuff is filtered off and washed on the filter with dilute sodium chloride solution. It is then stirred into 1000 parts of cold water with the addition of 50 parts by volume of a 2 N-solution of sodium hydroxide, 25 parts by volume of a 2 N-solution of sodium nitrite are added, and diazotization is brought about by pouring in in one portion 35 parts of hydrochloric acid of 30 percent strength previously diluted with a small

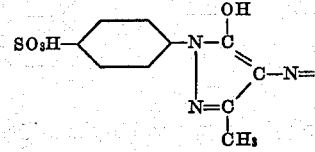 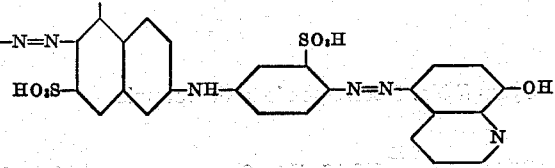

amount of water. The mixture is stirred for a few hours at about 10° C., and then there are added 8 parts of 8-hydroxyquinoline dissolved in 50 parts of water and 7 parts of hydrochloric acid of 30 percent strength and then 30 parts of sodium carbonate dissolved in water. The whole is stirred first by cooling, and then at room temperature, and the precipitated dyestuff is filtered off. In the dry state it is a dark powder which dissolves in concentrated sulfuric acid with a blue coloration and in water with a blue-violet coloration, and dyes cotton by the single bath or 2-bath after-coppering process navy blue tints which are fast to washing and light.

A very similar dyestuff is obtained by using, instead of 9.6 parts of 1-phenyl-3-methyl-5-pyrazolone, 14.5 parts of 1-phenyl-3-methyl-5-pyrazolone-3'-sulfonic acid amide.

This dyestuff corresponds to the formula

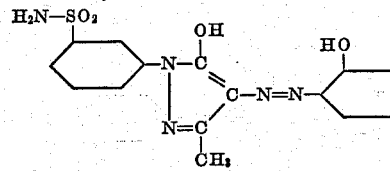 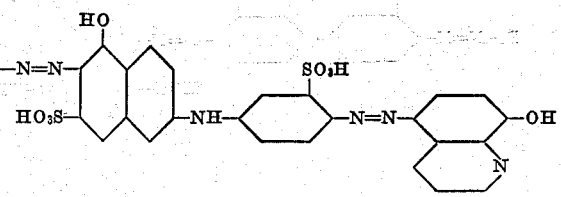

whole is stirred for a few hours at about 10° C., and then there are added 8 parts of 8-hydroxyquinoline dissolved in 50 parts of water and 7 parts of hydrochloric acid of 30 percent strength, and then 30 parts of sodium carbonate dissolved in water. The whole is stirred first while cooling, and then at room temperature and the precipitated dyestuff of the formula is filtered off. In the dry state it is a dark powder which dissolves in concentrated sulfuric acid with a blue coloration and in water with a blue-violet coloration, and dyes cotton by the single bath or 2-bath after-coppering process navy blue tints which are fast to washing and light.

In the following table are given a few further dyestuffs, which likewise dye cotton by the single bath or 2-bath after-coppering process fast navy blue tints and which are obtainable in the manner described above by coupling the tetrazo-compounds of the diamines given in column II with the coupling components in columns I and III, further diazotizing the amino-disazo-dyestuffs so obtained, and coupling the diazo-disazo-compounds with 8-hydroxyquinoline.

Example 2

10.8 parts of 3:3'-dihydroxy-4:4'-diaminodiphenyl are tetrazotized as described in Example 1 and coupled with 20.5 parts of 2-(4'-aminophenylamino)-5-hydroxynaphthalene-7:3'-disulfonic acid. When the intermediate product, namely the diazo-monoazo-dyestuff, is formed there are added a neutral aqueous solution of 14 parts of 1-phenyl-3-methyl-5-pyrazolone-4'-sulfonic acid and about 50 parts of picoline, and the whole is stirred initially while cooling and finally at about 25–30° C. When the coupling is complete, the mixture is diluted with sodium chloride solution of 30 percent strength, and the precipitated disazo-dyestuff is filtered off and washed on the filter with sodium chloride solution of 30 percent strength. The dyestuff is dissolved in 500 parts of warm water with the addition of 50 parts by volume of a 2 N-solution of sodium hydroxide, then cooled to about 15° C. with ice, and after addition of 25 parts by volume of a 2 N-solution of sodium nitrite, diazotization is brought about by the addition of 35 parts of hydrochloric acid of 30 percent strength which has previously been diluted with a small amount of water. The

|   | I | II | III |
|---|---|---|---|
| 1 | 1-phenyl-3-methyl-5-pyrazolone-3'-sulfonic acid. | 3:3'-dihydroxy-4:4'-diaminodiphenyl. | 2-(4'-aminophenylamino)-5-hydroxynaphthaline-7:3'-disulfonic acid. |
| 2 | 1-(4'-hydroxyphenyl)-3-methyl-5-pyrazolone-3'-carboxylic acid. | ___do___ | Do. |
| 3 | 1-phenyl-5-pyrazolone-3'-carboxylic acid. | ___do___ | Do. |
| 4 | Acetoacetylaminobenzene. | ___do___ | Do. |
| 5 | 3-methyl-5-pyrazolone. | ___do___ | Do. |
| 6 | 1-phenyl-3-methyl-5-pyrazolone-3'-sulfonic acid amide. | ___do___ | 2-[4''-amino-1':1''-diphenylylamino-(4')]-5-hydroxy-naphthalene-7:3''-disulfonic acid. |
| 7 | ___do___ | 4:4'-diaminodiphenyl-3:3'-dicarboxylic acid. | 2-(4'-aminophenylamino)-5-hydroxynaphthalene-7:3'-disulfonic acid. |
| 8 | 1-phenyl-3-methyl-5-pyrazolone. | 3:3'-di-(carboxymethoxy)-4:4'-di-aminodiphenyl. | Do. |
| 9 | 1-phenyl-3-methyl-5-pyrazolone-4'-sulfonic acid. | 3:3'-dimethoxy-4:4'-diaminodiphenyl. | Do. |

Dyestuff No. 2 corresponds to the formula

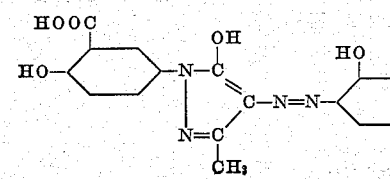 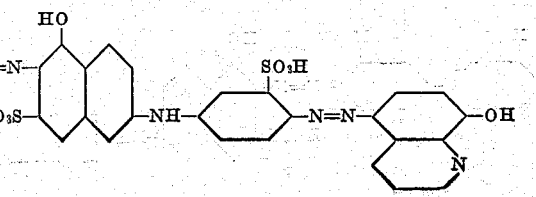

Dyestuff No. 6 corresponds to the formula

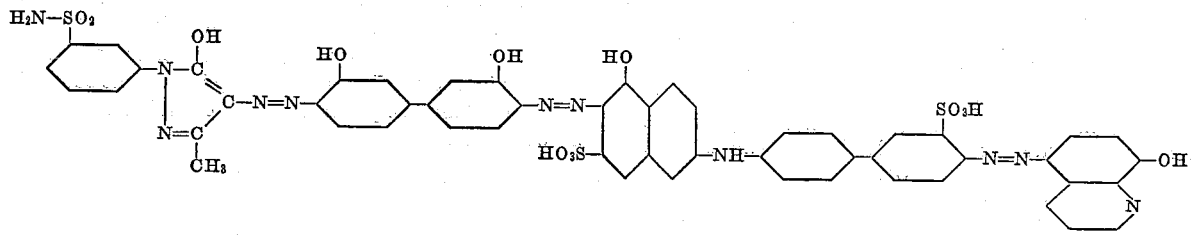

Dyestuff No. 8 corresponds to the formula

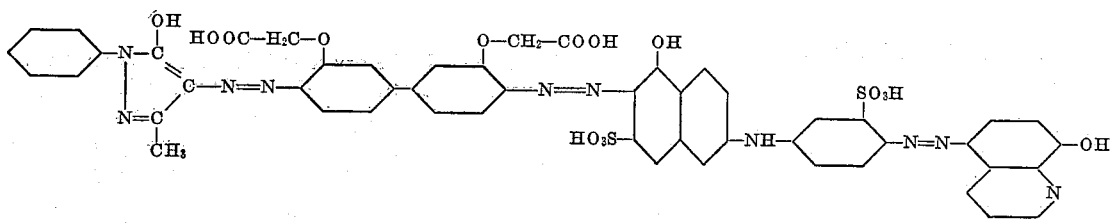

Example 3

100 parts of cotton are entered at 50° C. into a dyebath which contains in 4000 parts of water 1.5 parts of the dyestuff obtainable as described in Example 1 and 2 parts of anhydrous sodium carbonate. The temperature is raised to 90–95° C. in the course of 20 minutes, 40 parts of crystalline sodium sulfate are added, and dyeing is carried on for 30 minutes at 90–100° C. and then the dyebath is cooled to about 70° C., 3 parts of complex sodium copper tartrate of approximately neutral reaction are added, coppering is carried on for about ½ hour at 80° C., and then the dyeing is rinsed with cold water. If desired, the dyeing may be soaped by after-treatment with a solution which contains 5 parts of soap and 2 parts of anhydrous sodium carbonate in 1000 parts of water. There is obtained a navy blue dyeing of very good fastness to washing and light.

What is claimed is:

1. An azo dyestuff of the formula

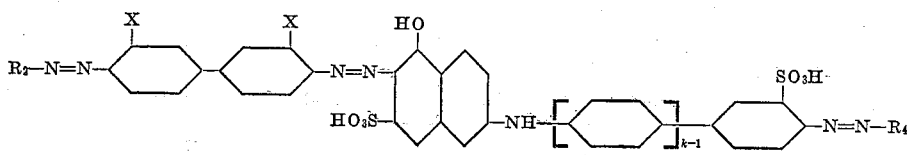

in which X represents a member selected from the group consisting of a hydroxyl group, a carboxylic acid group, a carboxy-methoxy group and a methoxy group, $R_2$ represents a radical of an azo component bound to the azo group at a keto-methylene group, $k$ represents a whole number of at the most 2, and $R_4$ represents the radical of an 8-hydroxyquinoline.

2. An azo dyestuff of the formula

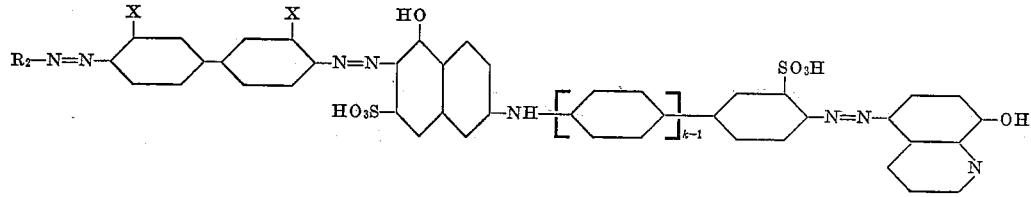

in which X represents a substituent of the composition $$-\left[\left(OCH_2\right)_{m-n+1}-CO-\right]_{n-1}-OH$$

$m$ and $n$ each denoting a whole number of at the most 2, $R_2$ represents the radical of a 5-pyrazolone bound in 4-position to the azo group and $k$ represents a whole number of at the most 2.

3. An azo dyestuff of the formula

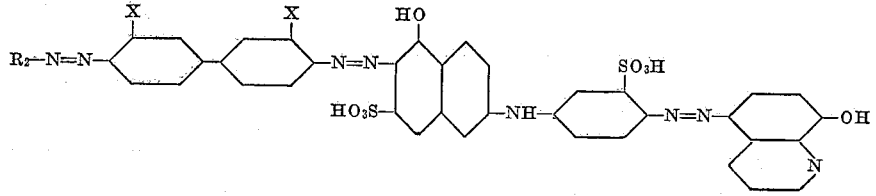

in which X represents a substituent of the composition $$-\left[\left(OCH_2\right)_{m-n+1}-CO-\right]_{n-1}-OH$$

$m$ and $n$ each denoting a whole number of at the most 2, $R_2$ represents the radical of a 5-pyrazolone bound in 4-position to the azo group.

4. An azo dyestuff of the formula

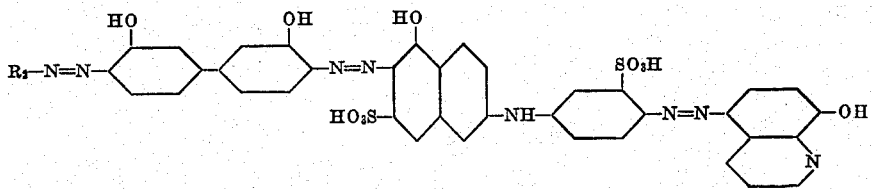

in which $R_2$ represents the radical of a 5-pyrazolone bound in 4-position to the azo group.

5. An azo dyestuff of the formula

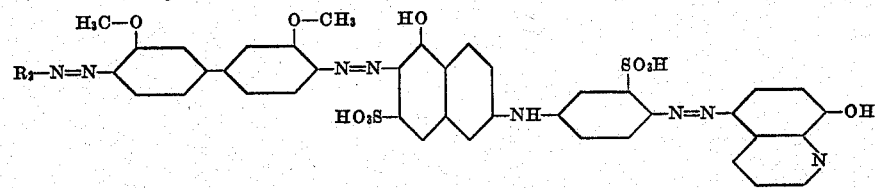

in which $R_2$ represents the radical of a 5-pyrazolone bound in 4-position to the azo group.

6. The azo dyestuff of the formula

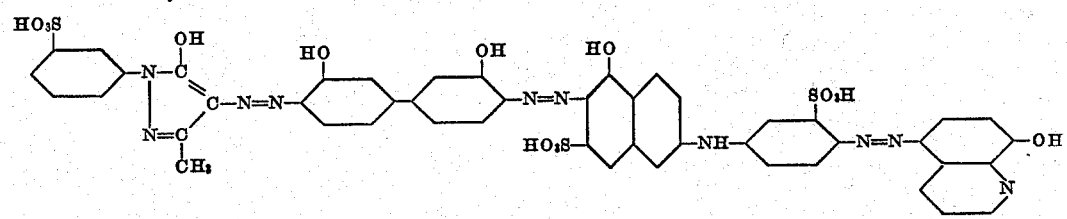

7. The azo dyestuff of the formula

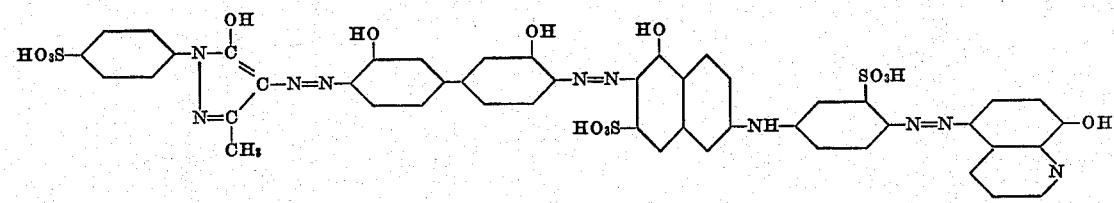

8. The azo dyestuff of the formula

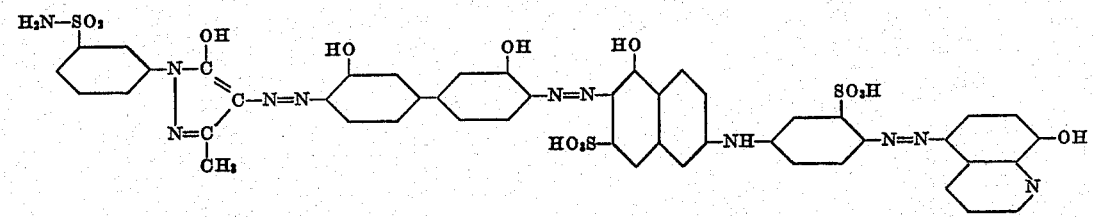

9. The azo dyestuff of the formula

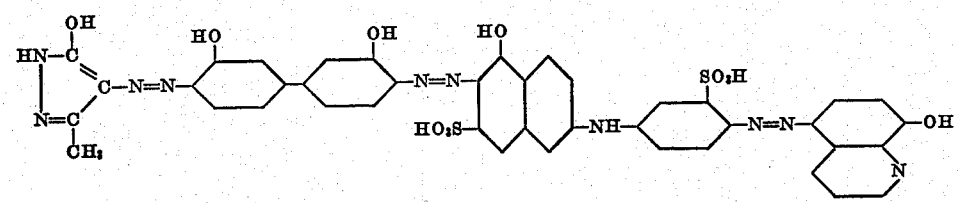

10. The azo dyestuff of the formula

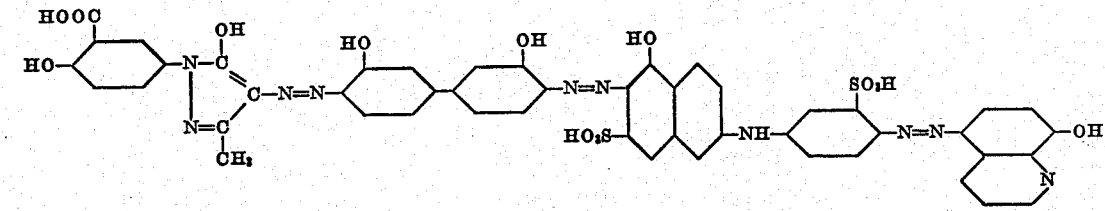

References Cited in the file of this patent

UNITED STATES PATENTS

| | | |
|---|---|---|
| 2,426,977 | Straub et al. | Sept. 9, 1947 |
| 2,717,891 | Hanhart et al. | Sept. 13, 1955 |